(12) United States Patent
Cairo et al.

(10) Patent No.: US 7,762,783 B2
(45) Date of Patent: Jul. 27, 2010

(54) TURBINE BLADE APPARATUS

(75) Inventors: Ronald Ralph Cairo, Greer, SC (US);
Arthur Samuel Peck, Greenville, SC (US)

(73) Assignee: General Electric Company, Schenectady, NY (US)

( * ) Notice: Subject to any disclaimer, the term of this patent is extended or adjusted under 35 U.S.C. 154(b) by 764 days.

(21) Appl. No.: 11/652,457

(22) Filed: Jan. 11, 2007

(65) Prior Publication Data
US 2010/0135812 A1    Jun. 3, 2010

(51) Int. Cl.
*F04D 29/70* (2006.01)
(52) U.S. Cl. .................. 416/223 R; 416/234
(58) Field of Classification Search ......... 416/223 R, 416/234
See application file for complete search history.

(56) References Cited

U.S. PATENT DOCUMENTS

| | | | | | |
|---|---|---|---|---|---|
| 4,326,836 | A | * | 4/1982 | Fitton | 416/196 R |
| 4,715,782 | A | * | 12/1987 | Shimmel | 416/32 |
| 4,883,216 | A | * | 11/1989 | Patsfall | 228/119 |
| 5,269,057 | A | * | 12/1993 | Mendham | 29/889.1 |
| 5,701,669 | A | * | 12/1997 | Meier | 29/889.1 |
| 5,865,364 | A | * | 2/1999 | Trask et al. | 228/212 |

\* cited by examiner

*Primary Examiner*—Igor Kershteyn
(74) *Attorney, Agent, or Firm*—Cantor Colburn LLP

(57) ABSTRACT

A gas turbine airfoil is disclosed. The gas turbine airfoil includes a root section, a separate extension section attached to the root section, and a joint disposed between the root section and the extension section, the joint including at least one of a mechanical interlock and a metallurgical bond.

21 Claims, 4 Drawing Sheets

- 810: Applying a bonding agent
- 820: Positioning the root section relative to the extension section
- 830: Exposing the root section, the extension section, and the bonding agent to an activation species
- 840: Creating a metallurgical bond

TURBINE BLADE APPARATUS

BACKGROUND OF THE INVENTION

The present disclosure relates generally to turbine blades and particularly to turbine blade construction.

Many gas turbines, as may be used for power generation and aircraft propulsion for example, utilize turbine blades that are manufactured by a single crystal casting process. A benefit of the single crystal casting process is that it can improve resistance of the turbine blade to low cycle fatigue that may be encountered during turbine operation.

In a power generation turbine, it is desirable to increase the span or length of the turbine blade or airfoil to allow for increased work output per blade to provide for increased power generation needs. The competitive figure-of-merit for increased output in terms of either increased turbine annulus area or mechanical speed is $AN^2$, where A represents the turbine annulus area and N represents the turbine speed. The airfoil span can be extended by a change in foundry practice to larger volume castings. Increasing the casting volume will also increase challenges associated with single crystal processing. These challenges include additional shrinkage, development effort and cost, and capacity constraints of currently available equipment.

Accordingly, there is a need in the art for a turbine airfoil arrangement that overcomes these drawbacks.

BRIEF DESCRIPTION OF THE INVENTION

An embodiment of the invention includes a gas turbine airfoil. The gas turbine airfoil includes a root section, a separate extension section attached to the root section, and a joint disposed between the root section and the extension section, the joint including at least one of a mechanical interlock and a metallurgical bond.

Another embodiment of the invention includes a method of assembling a gas turbine airfoil. The method includes applying a bonding agent to at least one of a protrusion and a recess, one each of the protrusion and the recess opposingly disposed on one each of a root section of the airfoil and a separate extension section of the airfoil. The method further includes positioning the root section relative to the extension section, exposing the protrusion, the recess, and the bonding agent to a species capable of activating the bonding agent, and creating a metallurgical bond between the root section and the extension section.

A further embodiment of the invention includes a gas turbine including, a casing to direct a gas flow, a rotor, and a plurality of gas turbine airfoils. At least one of the plurality of gas turbine airfoils includes a root section in mechanical connection with the rotor and a separate extension section attached to the root section.

BRIEF DESCRIPTION OF THE DRAWINGS

Referring to the exemplary drawings wherein like elements are numbered alike in the accompanying Figures:

FIG. 8 depicts a flowchart of a method of assembling a turbine airfoil in accordance with an embodiment of the invention.

DETAILED DESCRIPTION OF THE INVENTION

An embodiment of the invention provides a mechanical interlock taper joint augmented with a metallurgical bond to provide a redundant load path for joining one airfoil cross-section to another. The taper joint geometry provides improved load transfer efficiency resulting from a gradual introduction of loading along the length of the joint. The taper joint loads the metallurgical bond in compression and shear for improved joint integrity. Furthermore, the joint will balance structural and fabrication requirements.

An embodiment of the invention will provide airfoils with increased lengths for enhanced performance. Another embodiment will provide capability to repair damaged airfoils, such as airfoil tip failures, for example. Another embodiment will provide an airfoil that incorporates multiple material properties to employ a "design-to-material capability" philosophy to address issues such as de-tuning tip modes of vibration, and blade tip-to-case rub situations, for example.

Figure 1:
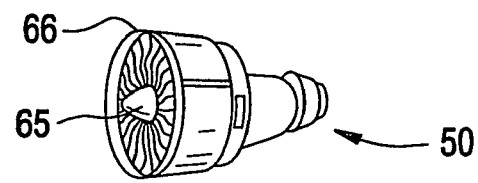
FIG. 1 depicts an end perspective view of a turbine in accordance with an embodiment of the invention.
Figure 2:
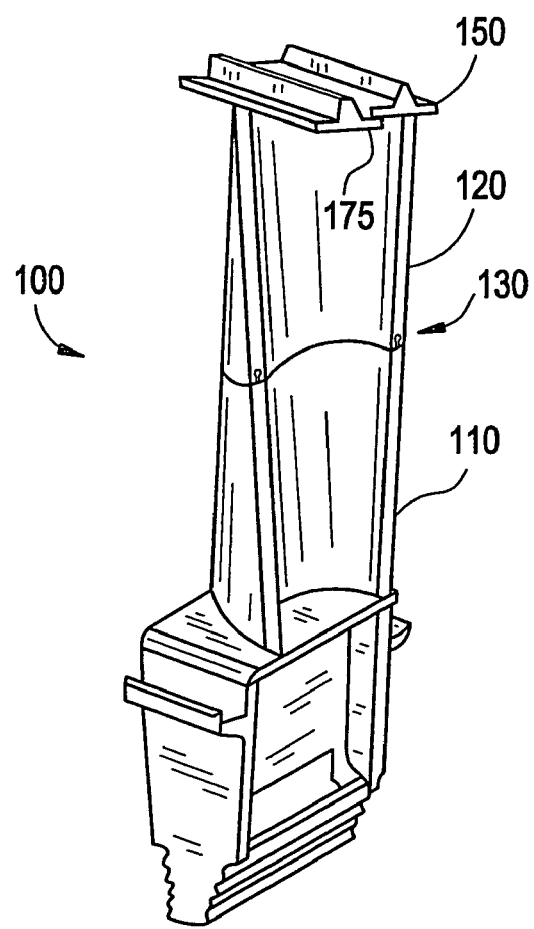
FIG. 2 depicts an end perspective view of an airfoil in accordance with an embodiment of the invention.

Referring now to FIG. 1, a perspective end view of a gas turbine 50 is depicted. In an embodiment, the gas turbine 50 is a power generation gas turbine. In another embodiment, the gas turbine 50 is an aircraft engine gas turbine. The gas turbine 50 includes a plurality of airfoils (one example of which is depicted in FIG. 2). A gas flows into a casing 66, and the gas flow is directed by the casing 66 to act upon the plurality of airfoils 100. The airfoils 100 provide a transformation of energy associated with an expansion of the gas into rotation of a rotor 65. The rotor 65 is rotatably disposed proximate the center of the gas turbine 50 in a manner that will be appreciated by one skilled in the art.

Referring now to FIG. 2, a perspective end view of an airfoil 100 of the turbine 50 is depicted. The airfoil 100 includes a root section 110, also herein referred to as a root, in mechanical connection with the rotor 65 (shown in FIG. 1) and a separate extension section 120, also herein referred to as an extension, attached to the root section 110 via a joint section 130, also herein referred to as a joint. Attachment of the extension 120 to the root 110 can allow for an increased airfoil 100 length beyond that which is currently practical via single crystal casting.

The extension 120 may be selected to be at least one of a different material and a different structure of the material of the root 110. Selection of different material properties for application requirements is known as "design-to-material capability". In an embodiment, the root 110 can include a single crystal material structure for resistance to low cycle fatigue, and the extension 120 can include a directionally solidified, or columnar grained material structure for enhanced resistance to creep. In another embodiment, the extension 120 will include a different material to de-tune a vibration response, which may be known as tip modes of vibration. In another embodiment, the extension 120 will include a different, lower-density material than the root 110, to reduce the mass of the extension 120. It will be appreciated that mass reduction at a tip 150 end of the airfoil 100 will reduce a centrifugal force generated by the extension 120 in response to rotation of the rotor 65.

Figure 3:
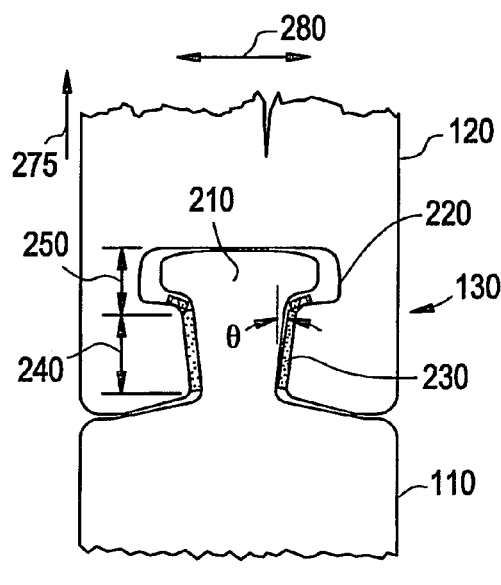
FIG. 3 depicts a magnified end view of an airfoil joint in accordance with an embodiment of the invention.

Referring now to FIG. 3, a magnified end view of the joint section 130 is depicted. An interlock protrusion 210 is disposed upon the root 110, and an interlock recess 220 is disposed within the extension 120. It will be appreciated that the geometry of the interlock protrusion 210 and the interlock recess 220 are complementary, such that the geometry of the recess 220 matches that of the protrusion 210, as is depicted in FIG. 3. The complementary geometry of the recess 220 and the protrusion provide a mechanical interlock to attach the extension 120 to the root 110. In an embodiment, the joint section 130 further includes a metallurgical bond 230 to attach the extension section 120 to the root section 110. The use of the metallurgical bond 230, in conjunction with the mechanical interlock, provides a redundant load path. That is, the metallurgical bond 230 and the mechanical interlock each provide a means for the joining of the extension 120 to the root 110, and a transfer of any loading between the extension 120 and the root 110. In an embodiment, the metallurgical bond 230 is a braze joint, including appropriate braze material, such as braze paste and braze foil, for example. In another embodiment, the metallurgical bond 230 is at least one of a transient liquid phase bond, a diffusion bond, a diffusion bond including pressure augmentation for an enhanced structural joint, and a hybrid bond, such as a pressured foil braze joint, for example.

While an embodiment has been described as having an airfoil root 110 including a protrusion 210 and an airfoil extension 120 including a recess 220, it will be appreciated that the scope of the embodiment is not so limited, and that the embodiment will also apply to airfoils having other joint arrangements, such as an airfoil root 110 that includes a recess 220 and an airfoil extension 120 that includes a protrusion 210, for example.

In an embodiment, the protrusion 210 and the recess 220 of the joint 130 each include a first portion 240 and a second portion 250. The first portion 240 of the protrusion 210 and the first portion 240 of the recess 220 each include a taper angle, indicated by θ in FIG. 3.

A thickness of the airfoil may be defined by direction line 280. The taper angle θ includes a back angle, such that the thickness of the first portion 240 of the protrusion 210 and the recess 220 decreases with an increase in displacement, or distance away from the second portion 250 of the protrusion 210 and recess 220, toward the first portion 240 of the protrusion 210 and recess 220, respectively. The taper back angle θ is such that in response to the centrifugal force in a direction shown by a direction line 275, applied by the extension 120 upon the root 110, at least one of a compressive force and a shear force will be generated between the first portion 240 of the protrusion 210, the recess 220, and the metallurgical bond 230. It will be appreciated that, as a property of strength of materials, one or both of a compressive and a shear force are preferred to a tensile force for enhanced joint strength. Accordingly, use of the taper back angle θ depicted in FIG. 3 will enhance the integrity of the response of the joint section 130 to the application of the centrifugal force. It is contemplated that a taper back angle θ of approximately ten degrees will provide optimum joint integrity. As used herein, the term "approximately" represents an amount of variation that includes manufacturing and design tolerances as appropriate for the application requirements.

In an embodiment, a thickness (as defined in relation to the direction line 280) of the second portion 250 of the protrusion 210 and the recess 220 is greater, or larger, than a thickness of the first portion 240 of the protrusion 210 and the recess 220. Accordingly, the thickness of the second portion 250 of the protrusion 210 will provide the mechanical interlock to prevent separation of the extension 120 from the root 110. The taper of the first portion 240 of the protrusion 210 and recess 220, and the thickness of the second portion 250 of the protrusion 210 and recess 220, are combined with the metallurgical bond 230 to provide the redundant load path, thereby enhancing the integrity of the joint 130 between the root 110 and the extension 120.

Figure 4:
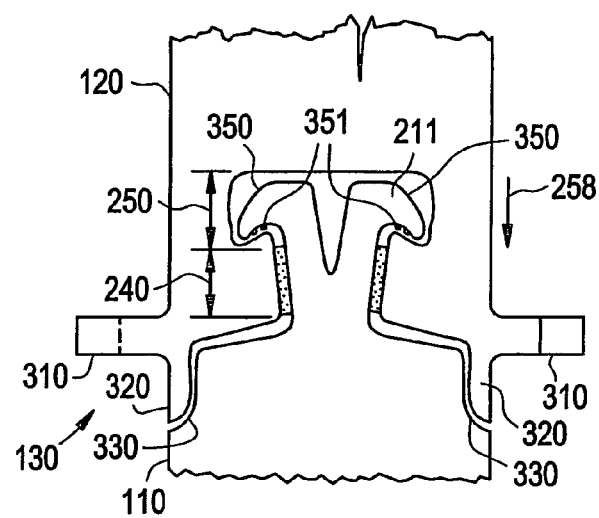
FIG. 4 depicts a magnified end view of an airfoil joint in accordance with an embodiment of the invention.

Referring now to FIG. 4, an embodiment of the joint 130 including a bifurcated protrusion 211 is depicted. The bifurcated protrusion 211 provides for increased assembly compliance. In response to an application of an assembly force, exerted upon the extension 120 in a direction depicted by a direction line 285 relative to the root 110, the second portion 250 of the bifurcated protrusion 211 will compress such that it will fit within the first portion 240 of the recess 220, and subsequently expand within the second portion 250 of the recess 220. Subsequent to the expansion of the second portion 250 of the bifurcated protrusion 211 within the second portion 250 of the recess 220, it will provide the mechanical interlock described above, to attach the extension 120 to the root 110. In an embodiment, insertion edges 350 of the bifurcated protrusion 211 will include geometry such that they will assist the compression of the second portion 250 of the bifurcated protrusion 211. In an embodiment, the insertion edges 350 include a lead angle. In an embodiment, geometry of a set of retention edges 351 will be configured such that they will prevent the compression of the second portion 250 of the bifurcated protrusion 211 subsequent to the attachment of the extension 120 onto the root 110. In an embodiment, the set of retention edges 351 will include features to engage the corresponding surface of the recess 220. In another embodiment, the set of retention edges 351 will include a back angle to engage with the corresponding surface of the recess 220 to prevent the compression of the second portion 250 of the bifurcated protrusion 211 subsequent to the attachment of the extension 120 onto the root 110.

In an embodiment, one of the root 110 and the extension 120 will include a part-span shroud 310. The part-span shroud 310 is configured to provide a support between two adjacent airfoils 100. In current airfoils 100, a shroud 175 is often disposed at the tip 150 of the airfoil 100, as depicted in FIG. 2. It is contemplated that as the overall length or span of the airfoil 100 is increased, in order to increase the annular area of the gas turbine 50, it may become less suitable to dispose the shroud 310 at the tip 150 of the airfoil 100 as a result of excessive centrifugal loading of the extension 120. Accordingly, the part-span shroud 310 is disposed proximate the joint 130 of the airfoil 100. In an embodiment, the part-span shroud 310 is disposed upon the extension 120 of the airfoil 100 proximate the joint. It is contemplated that a compressive loading will result in response to engagement of the part-span shrouds 310 of adjacent airfoils 100. This compressive loading is contemplated to introduce a favorable stress state to augment the strength of the metallurgical joint 130, as well as provide an increased frictional load to augment the mechanical load path. It is further contemplated that proper selection of joint geometry, in conjunction with the compressive stress state, will provide a strength of the joint 130 that can exceed a strength of the parent alloy.

In an embodiment, at least one of the root 110 and the extension 120 include an overlap lip 320. The overlap lip 320 is included to reduce airflow disruption at the joint 130. In an embodiment, the overlap lip 320 extends from the extension 120 into a complementary recess 330 disposed upon the root 110 proximate the joint 130. It is contemplated that in an embodiment that includes the part-span shroud 310 disposed near the overlap lip 320, the inter-blade loading (between airfoils 100) will be compressive and therefore assist in maintaining a favorable overlap lip 320 seal within the complementary recess 330.

Figure 5:
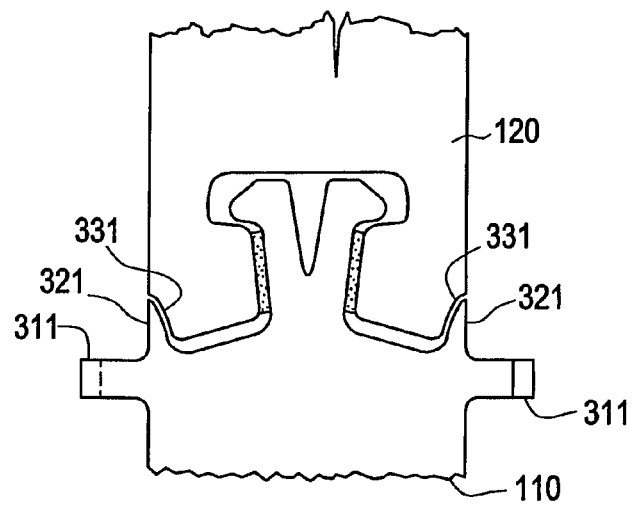
FIG. 5 depicts a magnified end view of an airfoil joint in accordance with an embodiment of the invention.

Referring now to FIG. 5, an alternate embodiment of the airfoil 100 is depicted. The airfoil 100 depicted in FIG. 5 includes a shroud 311 disposed upon the root 110 of the airfoil 100. In an embodiment, the overlap lip 321 extends from the root 120 into a complementary recess 331 disposed upon the extension 120 proximate the joint 130.

While an embodiment has been described having the shroud 310, 311 disposed proximate the joint 130, it will be appreciated that the scope of an embodiment is not so limited, and that an embodiment will apply to airfoils 100 that have the shroud 310, 311 disposed elsewhere along one of the root 110 and the extension 120, for example. Further, while an embodiment has been depicted having two overlap lips extending from one of the root and the extension into two complementary recesses within the other of the root and the extension, it will be appreciated that the scope of the embodiment is not so limited, and that the embodiment will also apply to airfoils 100 that have alternate configurations, such as one overlap lip and one recess opposingly disposed on each of the root and the extension, for example.

Figure 6:
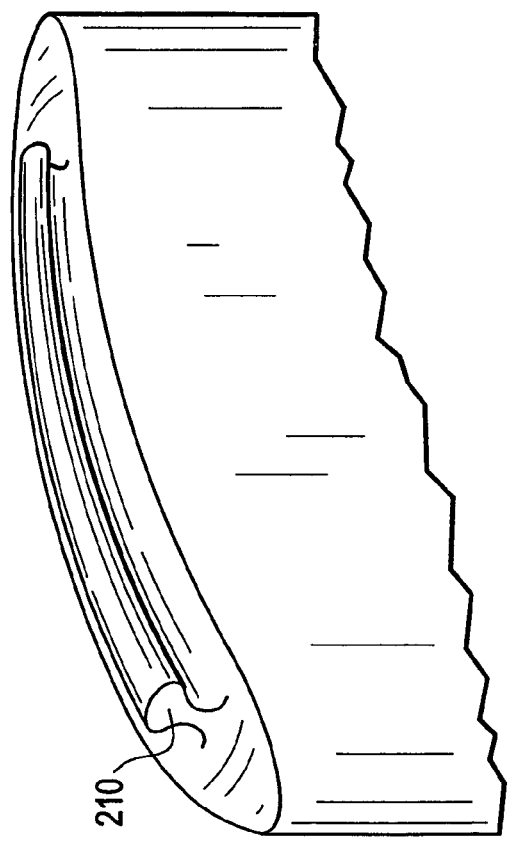
FIG. 6 depicts a top perspective view of an airfoil protrusion in accordance with an embodiment of the invention.

Referring now to FIG. 6, a top perspective view of the protrusion 210 is depicted. In an embodiment, the protrusion 210 is a single, large chordal width (into the plane of the page of FIGS. 2, 3, and 4) protrusion 210. The single, large chordal width protrusion 210 spans almost the full width of the airfoil 100. As used herein, the term "almost the full width" describes a single protrusion 210 of appropriate design to provide sufficient joining strength between the root 110 and the extension 120. It may be desired to utilize the single, large chordal width protrusion 210 to provide increased surface area for the metallurgical bond 230.

Figure 7:
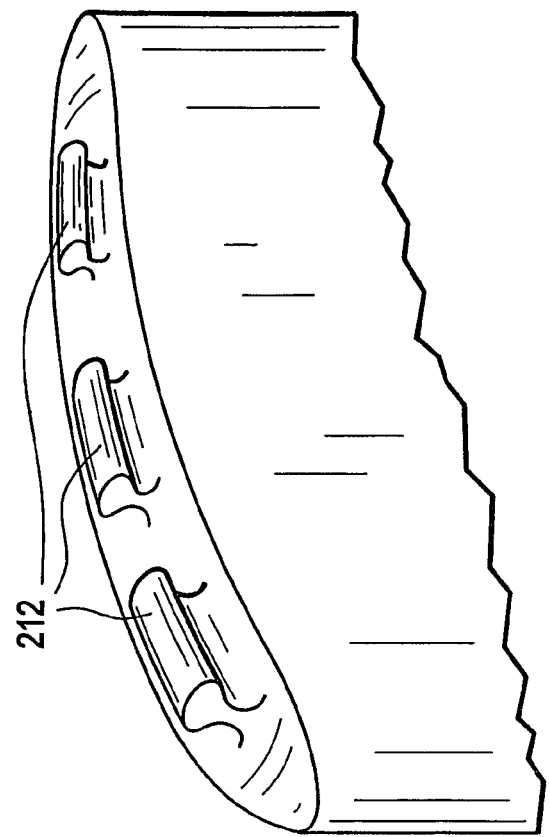
FIG. 7 depicts a top perspective view of an airfoil protrusion in accordance with an embodiment of the invention.

Referring now to FIG. 7, a top perspective view of an alternate protrusion arrangement is depicted. The alternate protrusion arrangement includes a set of castellated interlock protrusions 212. It may be desired to utilize the castellated interlock protrusions 212 to reduce the assembly force required to join the root 110 to the extension 120. It may also be desired to position the castellated interlock protrusions 212, and corresponding castellated interlock recesses, to provide directional alignment and retention between the root 110 and the extension 120.

Accordingly, assembly of the root 110 and the extension 120 will now be discussed with reference to FIGS. 3, 4, and 8. FIG. 8 depicts a generalized flowchart 800 of a method of assembling the turbine airfoil 100. The extension 120 and root 110 shall be assembled by first applying 810 a bonding agent, such as the braze paste or braze foil for example, to at least one of the protrusion 210, 212 and the recess 220, one each of the protrusion 210, 212 and the recess 220 opposingly disposed on one each of the root 110 of the airfoil 100 and the separate extension 120 of the airfoil 100. The assembly continues with positioning 820 the root 110 relative to the extension 120 such that the complementary geometry of the protrusion 210 and recess 220 are matched together. The assembly process further includes exposing 830, the protrusion 210, the recess 220, and the bonding agent to a species capable of activating the bonding agent, and creating 840 the metallurgical bond 230 between the root 110 and the extension 120.

In an embodiment, the positioning 820 includes aligning the root 110 relative to the extension 120 to ensure that they are located properly with respect to each other, and applying a compressive radial assembly force, as shown in FIG. 4 by the direction line 285, to the extension 120 and the root 110 to position the root 110 relative to the extension 120.

In another embodiment, the positioning 820 includes aligning the protrusion 210, 212 relative to the recess 220, and applying a tangential assembly force, such as into the plane of the page of FIGS. 3 and 4, to the root 110 and the extension 120. In response to the application of the tangential assembly force, the protrusion 210, 211 will slide within, and relative to, the recess 220. Accordingly, the application of the tangential assembly force will be controlled such as to properly position the root 110 relative to the extension 120.

In an embodiment, the exposing the root 110, the extension 120, and the bonding agent to an activation species includes applying heat to melt at least one of the braze foil and the braze paste.

In an embodiment, the assembly method further includes applying a compressive radial preload to the extension 120 in the direction 285 relative to the root 110 to increase the strength of the metallurgical bond 230 between the root 110 and the extension 120. The compressive radial preload may be applied contemporaneous to the exposing to the activation species. The appropriate quantity of radial preload to apply is a function of the material of the root 110 and the extension 120, and will be less than is required for other methods of assembly such as forge bonding, for example.

An embodiment of the assembly process also includes cooling, also herein referred to as applying cold to the protrusion 210, prior to the positioning 820, to cause the size of the second portion 250 of the protrusion 210 to become smaller, and allow for a reduced amount of assembly force to position the protrusion 210 within the recess 220, and thereby, the root 110 relative to the extension 120. In an embodiment, the assembly process further includes heating the recess 220, prior to the positioning 820, to cause the size of the first portion 240 of the recess 220 to become larger, and thereby allow for a reduced amount of assembly force to locate the protrusion 210 within the recess 220.

While an embodiment has been described as including the joint 130 to attach the extension 120 for increasing the overall length of the airfoil 100, it will be appreciated that the scope of an embodiment is not so limited, and that an embodiment will also apply to other airfoils 100 including joints 130. For example, the joint 130 may be used for repairing an airfoil 100 that has become damaged in use. In response to damage at a tip 150 (as shown in FIG. 2) disposed upon the extension 120 of the airfoil 100, the joint 130 can allow for replacement of the damaged tip 150 without the need to replace the entire airfoil 100. Additionally, a damaged airfoil 100 that does not include the joint 130 can be modified to incorporate the protrusion 210 to allow for subsequent attachment of the extension 120, such as to replace a damaged tip 150, for example. The airfoil 100 can be modified for repair via at least one of electro discharge machining (EDM), machining, grinding, and other appropriate processes to remove the damaged portion and incorporate the protrusion 210. In an alternate embodiment, the damaged airfoil 100 can be modified to incorporate the recess 220 to allow for subsequent attachment of the extension 120 that includes the protrusion 210.

While an embodiment has been depicted as a turbine airfoil 100 having a specific curvature at the joint section 130, it will be appreciated that the scope of the embodiment is not so limited, and that the embodiment will apply to other airfoils that may have different geometry at the joint section 130, such as a straight section, for example. Further, while an embodiment has been depicted having an illustrative protrusion and recess geometry, it will be appreciated that the scope of the embodiment is not so limited, and that the embodiment will also apply to turbine airfoils that include protrusions and recesses with alternate geometry.

As disclosed, some embodiments of the invention may include some of the following advantages: the ability to construct a turbine airfoil of increased overall length; the ability to construct a turbine airfoil utilizing multiple materials, each material optimized for specific application requirements; and the ability to repair a damaged airfoil.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A gas turbine airfoil comprising:
   a root section;
   a separate extension section attached to the root section; and
   a joint disposed between the root section and the extension section and disconnected from an aerodynamic surface of the gas turbine airfoil, the joint including at least one of a mechanical interlock and a metallurgical bond.

2. The gas turbine airfoil of claim 1, wherein:
   the gas turbine airfoil is at least one of a power generation gas turbine airfoil and an aircraft gas turbine airfoil.

3. The gas turbine airfoil of claim 1, wherein:
   at least one of the extension section and the root section comprise a part-span shroud.

4. The gas turbine airfoil of claim 1, wherein:
   the metallurgical bond comprises at least one of a brazed bond, a transient liquid phase bond, a diffusion bond, and a hybrid bond.

5. The gas turbine airfoil of claim 1, further comprising:
   a protrusion comprising a first portion and a second portion, the second portion larger than the first portion, the protrusion disposed upon one of the root section and the extension section; and
   a recess comprising a first portion and a second portion, the second portion larger than the first portion, the recess disposed within the other of the root section and the extension section and having a geometry complementary to a geometry of the protrusion.

6. The gas turbine airfoil of claim 5, wherein:
   the first portion of the protrusion and the first portion of the recess each comprise a taper.

7. The gas turbine airfoil of claim 6, wherein:
   a thickness of the first portion of the protrusion decreases with an increase in distance from the second portion of the protrusion; and
   a thickness of the first portion of the recess decreases with an increase in distance from the second portion of the recess.

8. The gas turbine airfoil of claim 6, wherein:
   the protrusion is at least one of a bifurcated protrusion and a castellated protrusion.

9. A method of assembling a gas turbine airfoil comprising:
   applying a bonding agent to at least one of a protrusion and a recess, one each of the protrusion and the recess opposingly disposed on one each of a root section of the airfoil and a separate extension section of the airfoil;
   positioning the root section relative to the extension section;
   exposing the protrusion, the recess, and the bonding agent to a species capable of activating the bonding agent; and
   creating a metallurgical bond between the root section and the extension section.

10. The method of claim 9, wherein the exposing comprises:
    applying heat to the protrusion, the recess and at least one of a braze foil and a braze paste to melt the at least one of the braze foil and the braze paste.

11. The method of claim 9, wherein the positioning comprises:
    aligning the protrusion relative to the recess; and
    applying a tangential assembly force to the root section and the extension section to position the root section relative to the extension section.

12. The method of claim 9, wherein the positioning comprises:
    aligning the root section relative to the extension section; and
    applying a radial assembly force to the root section and the extension section to position the root section relative to the extension section.

13. The method of claim 9, further comprising:
    prior to the positioning, applying at least one of heat to the recess, and cold to the protrusion.

14. The method of claim 9, further comprising:
    applying a radial preload to the root section and the extension section.

15. The method of claim 14, wherein:
    the applying the radial preload occurs contemporaneous to the exposing.

16. A gas turbine, comprising:
    a casing to direct a gas flow;
    a rotor; and
    a plurality of gas turbine airfoils, at least one of the plurality of gas turbine airfoils comprising:
    a root section in mechanical connection with the rotor; and
    a separate extension section attached to the root section via a joint disposed between the root section and the extension section and disconnected from an aerodynamic surface of the gas turbine airfoil.

17. The gas turbine of claim 16, the at least one of the gas turbine airfoils further comprising:
    at least one of a metallurgical bond and a mechanical interlock to attach the extension section to the root section.

18. The gas turbine of claim 17, wherein:
    the metallurgical bond comprises at least one of a brazed bond, a transient liquid phase bond, a diffusion bond, and a hybrid bond.

19. The gas turbine of claim 17, the at least one of the gas turbine airfoils further comprising:

a protrusion comprising a first portion and a second portion, the second portion larger than the first portion, the protrusion disposed upon one of the root section and the extension section; and a recess comprising a first portion and a second portion, the second portion larger than the first portion, the recess disposed within the other of the root section and the extension section and having a geometry complementary to a geometry of the protrusion.

20. The gas turbine of claim 19, wherein:
the first portion of the protrusion and the first portion of the recess each comprise a taper angle.

21. The gas turbine of claim 19, wherein:
the protrusion is at least one of a castellated protrusion and a bifurcated protrusion.

* * * * *